United States Patent
Boyd

(10) Patent No.: US 11,317,700 B2
(45) Date of Patent: May 3, 2022

(54) CARRYING DEVICE

(71) Applicant: Christopher Lee Boyd, Sevierville, TN (US)

(72) Inventor: Christopher Lee Boyd, Sevierville, TN (US)

( * ) Notice: Subject to any disclaimer, the term of this patent is extended or adjusted under 35 U.S.C. 154(b) by 85 days.

(21) Appl. No.: 16/834,093

(22) Filed: Mar. 30, 2020

(65) Prior Publication Data

US 2020/0359773 A1 Nov. 19, 2020

Related U.S. Application Data

(60) Provisional application No. 62/847,924, filed on May 14, 2019.

(51) Int. Cl.
| | |
|---|---|
| *A45F 3/10* | (2006.01) |
| *A45F 3/14* | (2006.01) |
| *A45F 3/00* | (2006.01) |
| *B23K 9/32* | (2006.01) |

(52) U.S. Cl.
CPC ............. *A45F 3/10* (2013.01); *A45F 3/14* (2013.01); *A45F 2003/003* (2013.01); *A45F 2003/144* (2013.01); *B23K 9/327* (2013.01)

(58) Field of Classification Search
CPC ..... A45F 3/10; A45F 2003/003; B23K 9/327; B23K 37/0294; B62B 2202/022; A62B 25/00
See application file for complete search history.

(56) References Cited

U.S. PATENT DOCUMENTS

| | | | | |
|---|---|---|---|---|
| 2,313,944 | A * | 3/1943 | Keener | B23K 5/22 224/201 |
| 2,667,397 | A * | 1/1954 | Hallisey | B62B 1/264 312/249.8 |
| 3,732,986 | A * | 5/1973 | Bush | B23K 9/32 211/70.1 |
| 4,253,716 | A * | 3/1981 | Turner, Jr. | B62B 1/264 206/373 |
| D265,603 | S * | 7/1982 | Winqvist | D34/28 |
| 4,573,665 | A * | 3/1986 | Strohl | B23K 9/013 219/383 |
| 4,625,949 | A * | 12/1986 | Walker | B62B 1/264 266/48 |

(Continued)

FOREIGN PATENT DOCUMENTS

| | | | |
|---|---|---|---|
| CN | 2912886 Y | * | 6/2007 |
| KR | 2163112 B1 | * | 10/2020 |

*Primary Examiner* — Justin M Larson
(74) *Attorney, Agent, or Firm* — Brennan, Manna & Diamond, LLC

(57) ABSTRACT

A carrying device for retaining an oxy-acetylene soldering kit. The carrying device comprises a frame and a harness attached to the frame configured to allow a user to transport the oxy-acetylene soldering kit. The carrying device further comprises a compartment attached to a front side of the frame for retaining tools and equipment. The carrying device further comprises a cylinder retaining component positioned within the compartment configured to retain and secure an oxygen tank and an acetylene tank. The carrying device further comprises a supply retaining component and a torch retaining component attached to the frame for holding soldering supplies and a soldering torch.

6 Claims, 4 Drawing Sheets

(56) References Cited

U.S. PATENT DOCUMENTS

| | | | | |
|---|---|---|---|---|
| 4,899,968 | A * | 2/1990 | Eaglin | A47F 5/02 211/78 |
| 5,396,885 | A * | 3/1995 | Nelson | A62B 25/00 128/204.18 |
| 5,769,431 | A * | 6/1998 | Cordova | B62D 51/04 280/1.5 |
| 6,116,623 | A * | 9/2000 | Salvucci | B62B 1/264 280/47.26 |
| D463,650 | S * | 9/2002 | Intravatola | D34/24 |
| 6,942,228 | B2 * | 9/2005 | Bunce | A01M 31/006 280/1.5 |
| 7,114,732 | B1 * | 10/2006 | Ismail | B23K 9/32 280/47.34 |
| 7,419,169 | B2 * | 9/2008 | Intravatola | B62B 1/264 280/47.26 |
| 7,628,407 | B1 * | 12/2009 | Krowl | B62B 1/12 266/48 |
| D640,029 | S * | 6/2011 | Barnes | D34/18 |
| 8,172,241 | B2 * | 5/2012 | Salvucci, Jr. | B62B 3/104 280/47.26 |
| 8,203,096 | B2 * | 6/2012 | Sanders | H05H 1/26 219/121.48 |
| 8,350,182 | B2 * | 1/2013 | Shipulski | H05H 1/26 219/121.48 |
| 9,259,067 | B2 * | 2/2016 | Kruse | A45C 3/00 |
| 9,751,161 | B2 * | 9/2017 | Stewart | B62B 1/264 |
| 9,861,179 | B2 * | 1/2018 | Kotter | A45F 3/14 |
| 9,867,450 | B2 * | 1/2018 | Kotter | A45F 3/10 |
| 9,885,479 | B2 * | 2/2018 | Glass | B23K 9/327 |
| 10,517,375 | B2 * | 12/2019 | Hoppa | A45F 3/04 |
| 2003/0010343 | A1 * | 1/2003 | York | A62B 25/00 128/205.22 |
| 2005/0168002 | A1 * | 8/2005 | Herring | B23K 9/32 294/146 |
| 2006/0060624 | A1 * | 3/2006 | Duncan | A45F 3/14 224/602 |
| 2008/0093781 | A1 * | 4/2008 | Stanton | B23K 7/10 266/75 |
| 2008/0149611 | A1 * | 6/2008 | Roth | B23K 9/32 219/137.7 |
| 2008/0230669 | A1 * | 9/2008 | Brady | B62B 3/104 248/346.03 |
| 2009/0026236 | A1 * | 1/2009 | Krause | A45C 13/30 224/264 |
| 2010/0024822 | A1 * | 2/2010 | Leon | A62B 7/02 128/205.22 |
| 2010/0294821 | A1 * | 11/2010 | Szabo | A45F 3/00 224/661 |
| 2016/0107271 | A1 * | 4/2016 | Stewart | B62D 63/061 280/402 |
| 2020/0077773 | A1 * | 3/2020 | Davie | A45F 3/06 |
| 2020/0359773 | A1 * | 11/2020 | Boyd | A45F 3/14 |
| 2021/0129255 | A1 * | 5/2021 | Schraff | B23K 11/26 |

* cited by examiner

CARRYING DEVICE

CROSS-REFERENCE

This application claims priority from Provisional Patent Application Ser. No. 62/847,924 filed on May 14, 2019.

BACKGROUND

Acetylene is one of the most widely used and dangerous industrial gases used throughout the world. It is commonly used in a wide variety of soldering and welding applications. Oxy-fuel welding and oxy-fuel cutting are processes that use a fuel gas, such as acetylene, in combination with oxygen to weld, solder, or cut metals. A tank of acetylene gas and a separate tank of oxygen gas are used in conjunction with a gas soldering apparatus which connects the two sources. The gas soldering apparatus uses separate regulators and hoses for each tank that come together and connect in a torch or other tool. Due to the volatility of acetylene, these hoses are typically short in length to allow the user to keep a close watch on the acetylene tank.

Six foot hoses are a common length for hoses used for these apparatuses in the industry. When soldering or welding is needed for applications more than six feet off the ground, someone has to hold the tanks off of the ground while a second person welds or solders as the typical hoses are too short. Likewise, it can be difficult and dangerous to climb while carrying the tanks and tools making people susceptible to accidents, industries, and falls. Additionally, it can be a hassle to carry multiple tools, including a hot torch, from a job site back to a car or workstation.

Accordingly, there is a great need for a way to extend the working length of a welding or soldering system. The present invention provides a device that safely retains all of the soldering equipment components that is useable by a single operator. The device assists heating and cooling installers, technicians, plumbers, and anyone who uses a smaller oxygen acetylene torch set. The device eliminates the need for a second person to hold the tanks up off of the ground because the hoses are too short. It includes an ergonomic way to store all of the soldering and welding tools along with the gas tanks. Advantageously, the present invention saves a considerable amount of time and frustration while improving efficiency and safety on worksites.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a carrying device. The carrying device is typically used to retain a oxy-acetylene soldering kit while allowing for portability. The carrying device comprises a frame and a harness that is attachable to the frame. The frame may comprise a perimeter component, a vertical brace, and a horizontal brace. The frame further comprises a plurality of harness attachment elements located along the perimeter component. The harness comprises a pair of shoulder straps, a waist strap. The harness is attachable to the frame via the plurality of harness attachment elements. Each of the shoulder straps and the waist strap may comprise a cushion element for distributing pressure from the carrying device when worn by a user.

The carrying device further comprises a compartment attachable to the frame. The compartment may be rigid in construction with at least one divider for holding tools. The carrying device further comprises a cylinder retaining component. The cylinder retaining component is positioned within the compartment. The cylinder retaining component comprises a first cylinder holder and a second cylinder holder. The first and second cylinder holders are substantially tubular in configuration and sized to retain an oxygen cylinder and an acetylene cylinder from the soldering kit respectively. The cylinder retaining component may further comprise at least one cylinder securing element configured to secure the oxygen and acetylene cylinders within the first and second cylinder holders.

The carrying device further comprises a torch retaining component. The torch retaining component may be a circular, rectangular, or square tube or compartment that is attachable to the perimeter of the frame. The torch retaining component is sized to retain a torch from the soldering kit. The carrying device further comprises a supply retaining component. The supply retaining component may be a circular, rectangular, or square tube or compartment that is attachable to the perimeter of the frame. The supply retaining component is sized to retain supplies used during soldering operations.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION OF THE INVENTION

Figure 1:
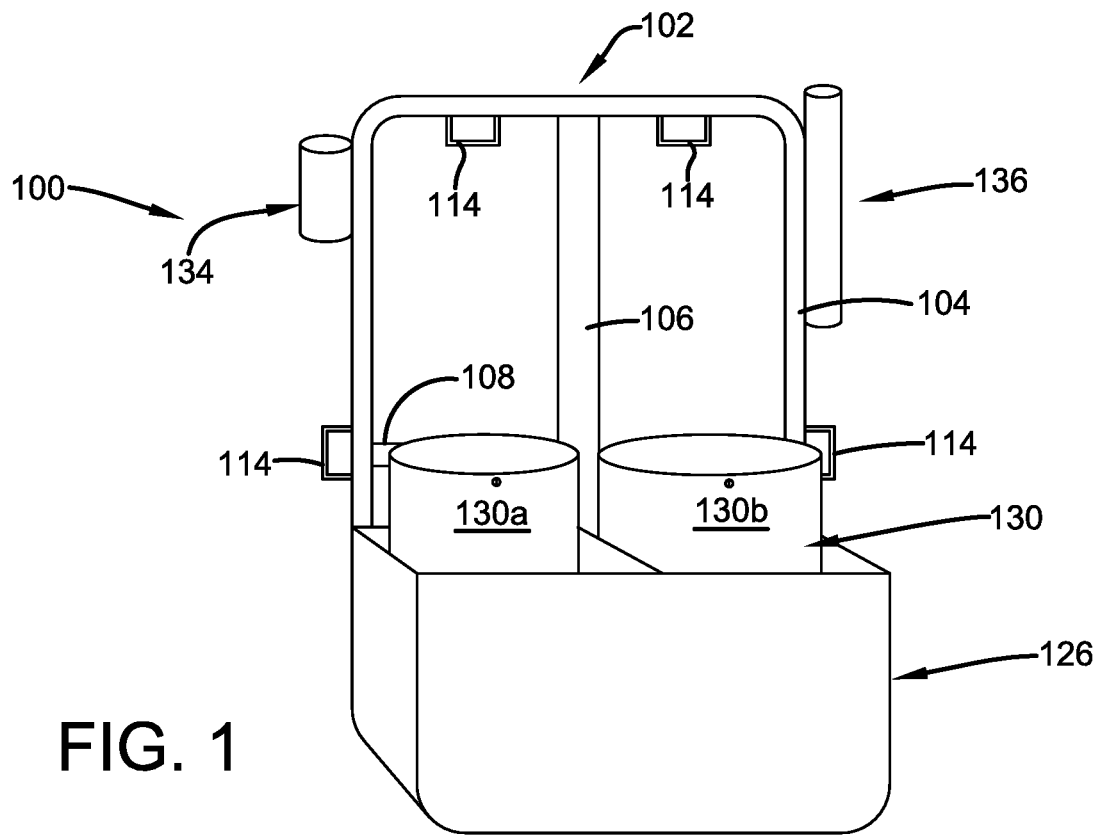
FIG. 1 illustrates a front perspective view of a carrying device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a unique carrying device for a soldering or welding kit, such as an oxygen acetylene torch set with associated tools, soldering materials, and equipment. The carrying device typically includes a large divided pocket for storing cutters, tips, and miscellaneous soldering tools. The carrying device allows a user to carry an oxygen acetylene torch set up high distances off of the ground.

This innovative product may feature an army-style backpack frame made from aluminum, composites, plastics, metal, or other suitable materials. The frame may comprise substantially round tubes for holding oxygen and acetylene tanks, and round, square, or rectangular tubing or compartments for holding blazing rods and a torch. The backpack frame can also include a large divided pocket or compartment for storing cutters, tips, and other tools. Additionally, a harness may comprise back and shoulder straps that are padded and covered with a nylon or other durable fabric for maximum comfort during use. In one embodiment, the frame can measure approximately twenty inches in height and approximately twelve inches in width, although the specifications can vary as desired.

Referring initially to FIGS. 1-8, a carrying device 100 comprises a frame 102 and a harness 116. The carrying device 100 is configured to retain and carry a soldering or welding kit with gas cylinders, such as an oxy-acetylene soldering kit with an oxygen cylinder and an acetylene cylinder. The frame 102 is typically manufactured from aluminum tubing and bracing, but may be manufactured from other metals, composite materials, plastics, light weight alloys, or the like. The frame 102 comprises a perimeter component 104. The perimeter component 104 is typically rounded metal tubing used to form a substantially rectangular frame.

The frame 102 may further comprise a vertical brace 106 manufactured from tubing or strapping that is welded, adhered, mechanically fastened, or otherwise affixed to the perimeter component 102 at two points. The frame 102 may further comprise a horizontal brace 108 manufactured from tubing or strapping that is welded, adhered, mechanically fastened, or otherwise affixed to the perimeter component 102 at two points. The vertical brace 106 is vertically disposed within the perimeter component 104, and the horizontal brace 108 is horizontally disposed within the perimeter component 104.

Figure 2:
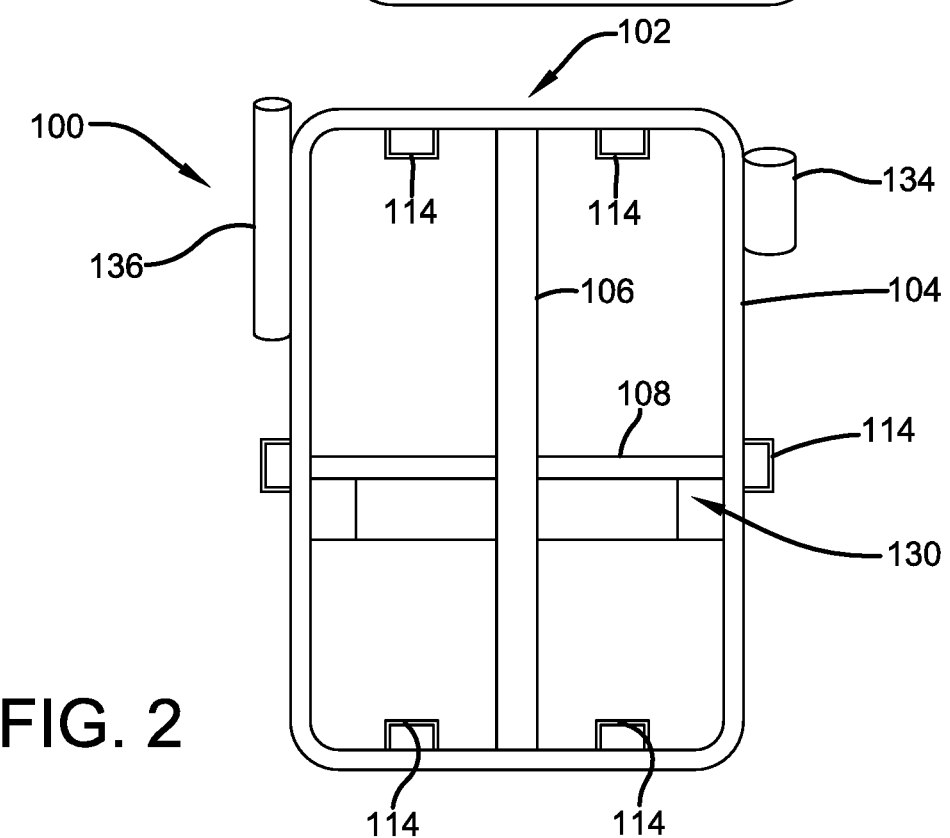
FIG. 2 illustrates a rear perspective view of the carrying device in accordance with the disclosed architecture.
Figure 7:
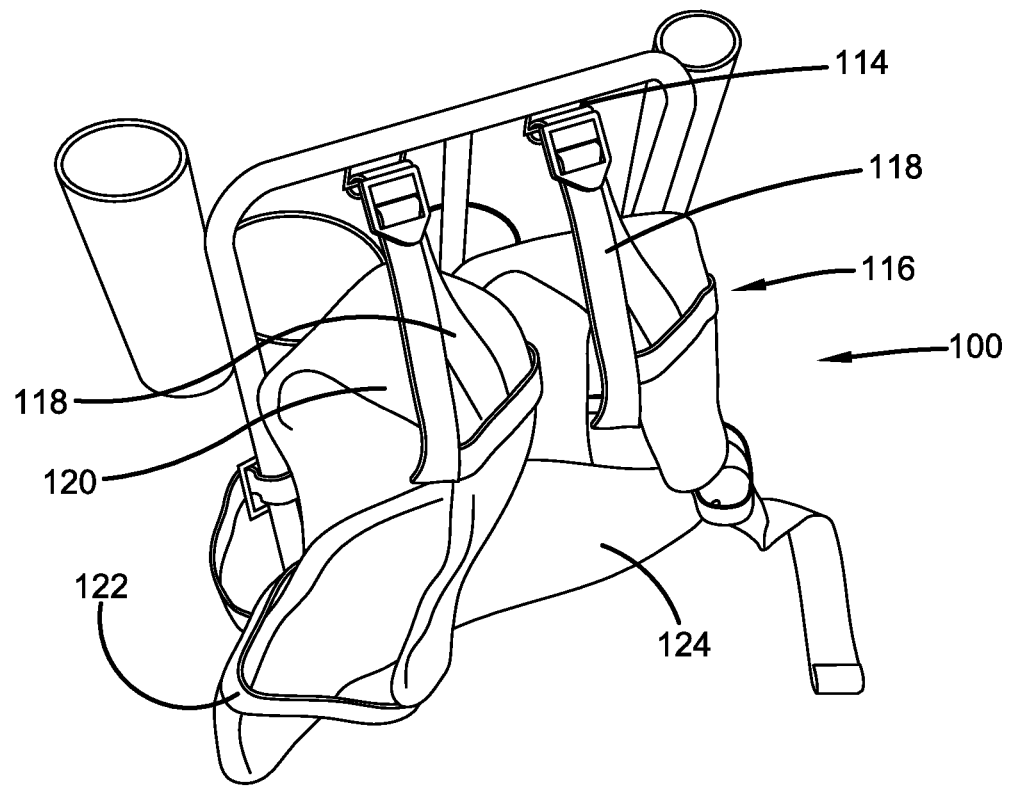
FIG. 7 illustrates a rear perspective view of a harness of the carrying device in accordance with the disclosed architecture.
Figure 8:
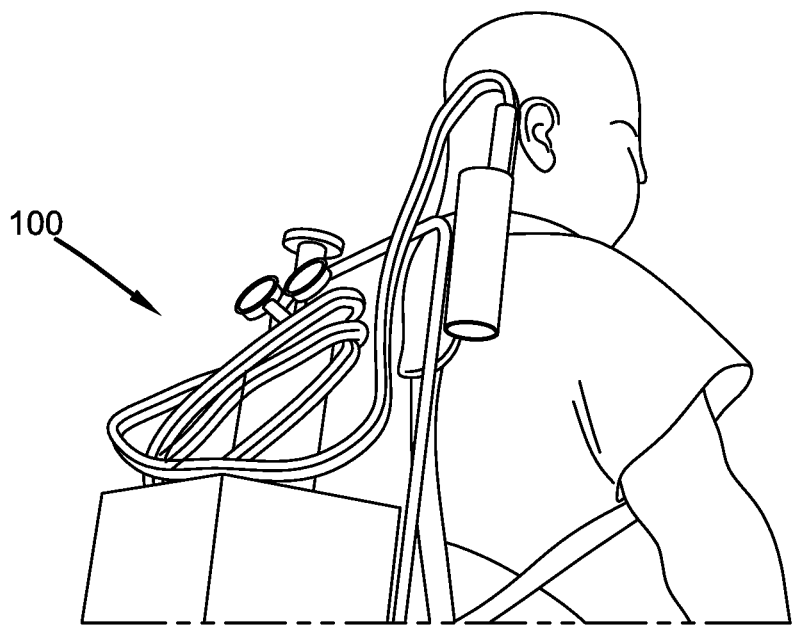
FIG. 8 illustrates a perspective view of a user wearing the carrying device in accordance with the disclosed architecture.

The frame 102 further comprises a plurality of harness attachment elements 114. The plurality of harness attachment elements 114 may be buckles, strap holders, snaps, or mechanical connections configured to attach and secure the harness 116 to a back side of the frame 102 as illustrated in FIGS. 2 and 7. The harness 116 comprises a pair of shoulder straps 118. Each of the pair of shoulder straps 118 may comprises a cushion element 120 for distributing pressure from the carrying device 100 when worn by a user as illustrated in FIG. 8. The harness 116 further comprises a waist strap 122. The waist strap 122 may comprises a cushion element 124 for distributing pressure from the carrying device 100 when worn. The pair of shoulder straps 118 and the waist strap 122 may be constructed from nylon, plastic, cloth, or any flexible material typically used for backpack type straps.

The carrying device 100 further comprises a compartment 126. The compartment 126 may be a rigid metal, composite, or plastic pocket attached to a front side of the frame 102 as illustrated in FIG. 1. The compartment 126 may comprise at least one divider 128. The compartment 126 may be used to store and hold cutters, tips, gas hoses, gas cylinder regulators, and other tools used for soldering.

Figure 3:
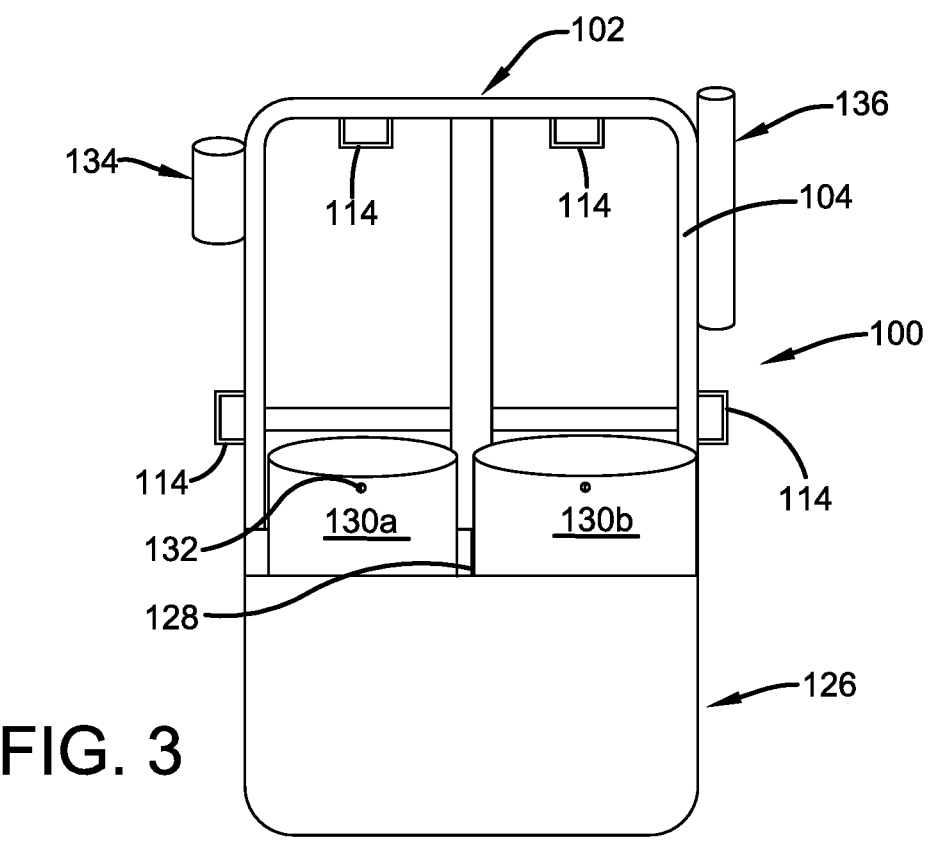
FIG. 3 illustrates a front perspective view of the carrying device in accordance with the disclosed architecture.
Figure 5:
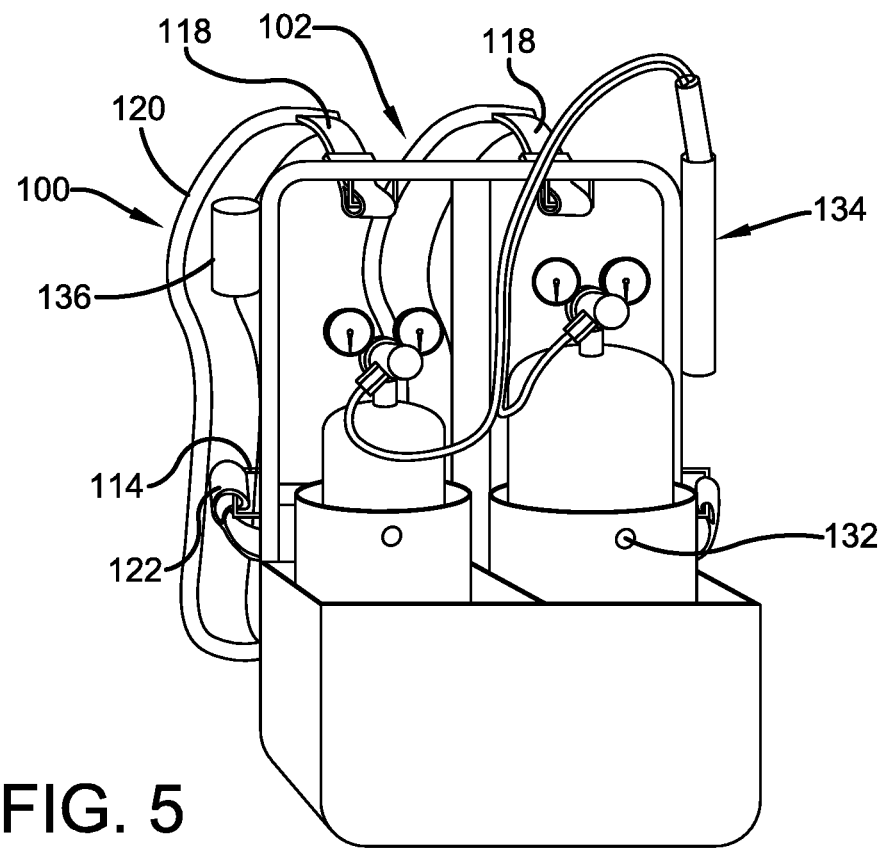
FIG. 5 illustrates a front perspective view of the carrying device retaining a soldering kit in accordance with the disclosed architecture.

The carrying device 100 further comprises a cylinder retaining component 130. The cylinder retaining component 130 is positioned at least partially within the compartment 126 as illustrated in FIGS. 1, 3, and 5. The cylinder retaining component 130 comprises a first cylinder holder 130(a) and a second cylinder holder 130(b). Both the first and second cylinder holders 130(a) and 130(b) are substantially circular and tubular in configuration and are sized to retain gas cylinders used in soldering and welding operations. The first and second cylinder holders 130(a) and 130(b) may be manufactured from metal, composite materials, wrapped fiberglass, or the like.

Figure 4:
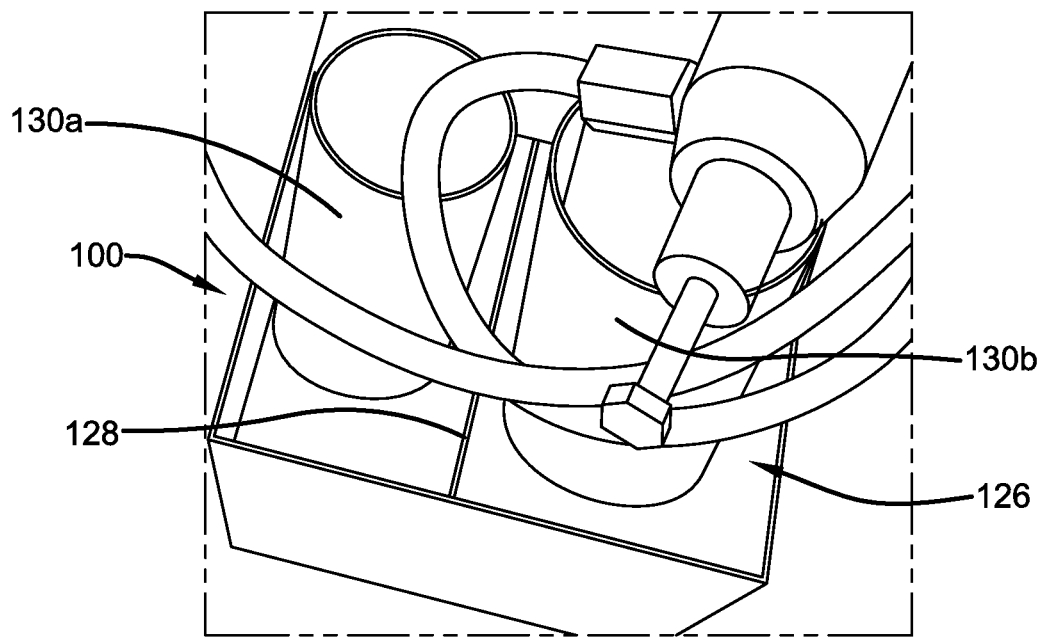
FIG. 4 illustrates an overhead perspective view of the carrying device in accordance with the disclosed architecture.
Figure 6:
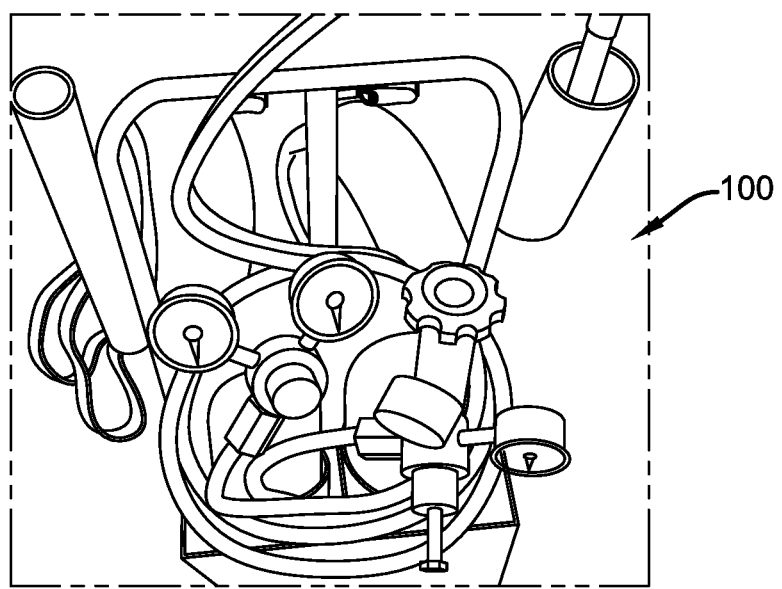
FIG. 6 illustrates an overhead perspective view of the carrying device retaining the soldering kit in accordance with the disclosed architecture.

The first cylinder holder 130(a) may be configured to retain and secure an oxygen gas cylinder and the second cylinder holder 130(b) may be configured to retain and secure an acetylene gas cylinder as illustrated in FIGS. 4-6. The cylinder retaining component 130 may further comprise at least one cylinder securing element 132. The at least one cylinder securing element 132 may be a strap or webbing used to secure the gas cylinders within the first and second cylinder holders 130(a) and 130(b). Alternatively, the at least one cylinder securing element 132 may be a mechanical fastener, such as a screw or bolt the frictionally engages a gas cylinder when placed within the first and second cylinder holders 130(a) and 130(b).

As illustrated in FIGS. 5 and 6, the carrying device 100 further comprises a supply retaining component 134. The supply retaining component 134 is attachable to the perimeter 104 of the frame 102. The supply retaining component 134 may be constructed from plastic or metal round, square, or rectangular tubing. The supply retaining component 134 may be used to hold soldering material, such as blazing rods.

The carrying device 100 further comprises a torch retaining component 136. The torch retaining component 136 is attachable to the perimeter 104 of the frame 102. The torch retaining component 136 may be constructed from plastic or metal round, square, or rectangular tubing. The torch retaining component 136 may be used to a torch from the soldering kit.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A carrying device comprising:
a frame comprising a perimeter component and a plurality of harness attachment elements attached to the frame;
a divided, rigid, non-collapsible compartment attached to the frame;
a cylinder retaining component comprising a first cylinder holder and a second larger cylinder holder each partially positioned within the compartment;
a torch retaining component attached to the perimeter of the frame;
a supply retaining component attached to the perimeter of the frame; and
a harness comprising a pair of shoulder straps, each shoulder strap comprising a cushion element, and a waist strap comprising a waist cushion element, the shoulder straps and the waist strap attached to the frame via the plurality of harness attachment elements.

2. The carrying device of claim 1, wherein the first cylinder holder is configured to retain an oxygen gas cylinder.

3. The carrying device of claim 1, wherein the second cylinder holder is configured to retain an acetylene gas cylinder.

4. A carrying device for retaining an oxy-acetylene soldering kit, the carrying device comprising:
a frame comprising a perimeter component and a plurality of harness attachment elements attached to the frame;
a non-collapsible compartment attached to a front side of the frame;
a cylinder retaining component comprising a first tubular cylinder holder and a second tubular cylinder holder positioned within the compartment;
a tubular torch retaining component attached to the perimeter of the frame;
a tubular supply retaining component attached to the perimeter of the frame opposite the tubular torch retaining component adapted to retain blazing rods; and
a harness comprising a pair of shoulder straps, each shoulder strap comprising a cushion element, and a waist strap comprising a waist cushion element, the shoulder straps and the waist strap attached to a back side of the frame via the plurality of harness attachment elements.

5. The carrying device of claim 4, wherein the first cylinder holder is configured to retain an oxygen gas cylinder and the second cylinder holder is configured to retain an acetylene gas cylinder.

6. The carrying device of claim 4, wherein the compartment is rigid and comprises at least one centrally located divider.

* * * * *